3,314,886
CALCIUM MIXED SALT LUBRICATING GREASES CONTAINING POLYCARBOXYLIC ACID

Arnold J. Morway, Clark, and Albert J. Bodner, Linden, N.J., assignors to Esso Research and Engineering Company, a corporation of Delaware
No Drawing. Filed Dec. 22, 1964, Ser. No. 420,456
7 Claims. (Cl. 252—32.7)

This invention relates to greases containing calcium mixed salts and improvements in the manufacture of these calcium mixed salt greases.

Lubricating greases containing calcium salt of various $C_8$ to $C_{30}$ fatty acids and calcium salt of acetic acid, have found widespread use in commercial applications because of their good antiwear and load-carrying properties. In the usual commercial manufacture of these greases, various contaminants are present and are left in the grease. For example, calcium mixed salt greases are made by neutralization of the acids with commercial lime. Various insoluble oxides of iron, silica, aluminum, magnesium and calcium are often present in commercial lime and end up as foreign particles in the lubricating grease made therefrom. Also, commercial acids frequently contain contaminants including dirt and debris. There is a demand for higher quality calcium mixed salt greases, particularly for use in precision bearings manufactured with extremely close tolerances. A higher purity grease can be formed by using higher grade and more expensive raw materials, but this is uneconomical. Filtering the calcium mixed salt grease to remove impurities is usually impractical because the grease is too viscous, even at very high temperatures, and many of these greases have no dropping points and do not melt once they are formed.

It has now been found that nitrogen-containing sludge dispersants, of the type used in lubricating oil, can be added to calcium mixed salt grease during its manufacture to keep the grease fluid whereby it can be filtered to remove contaminants. Then after said filtration, the lubricant can be quickly and readily gelled to a solid grease structure by the addition of a small amount of a high molecular weight polycarboxylic acid. It has been discovered that the gel resulting from the addition of the polycarboxylic acid usually is thixotropic and will fluidize upon shearing, while upon the cessation of said shearing, it will once again gel to its solid state. It has been further found that the addition of a small amount of a high molecular weight polyolefin, e.g. polyethylene or polypropylene, will eliminate the aforesaid thixotropy, since in some lubricating services, thixotropy is not desired.

More specifically, the invention is preferably carried out by first forming a fluid dispersion comprising lubricating oil, about 0.5 to 10.0 wt. percent, preferably 2 to 6 wt. percent dispersant, and about 20 to 50 wt. percent, preferably 25 to 40 wt. percent, of the calcium mixed thickener made by coneutralizing, with lime, the acetic acid and $C_8$ to $C_{30}$ fatty acid in a part of said oil, and preferably in the presence of said dispersant. The resulting fluid mass is then usually dehydrated to form calcium acetate half hydrate by heating to 250° to 340° F., and then filtered. The fluid mass can be further diluted with oil. About 0.5 to 5.0, preferably 1 to 3, wt. percent of the polycarboxylic acid is then added, usually in the form of an oil solution, to convert the fluid into a solid grease structure. Also 0.5 to 7.0 wt. percent of the aforesaid polyolefin may be added, if thixotropy is to be inhibited.

The calcium thickener is made by coneutralizing by the lime, about 1 to 40, preferably 5 to 15, parts by weight of acetic acid per part by weight of the high molecular weight $C_8$ to $C_{30}$ fatty acid.

Examples of the $C_8$ to $C_{30}$ acids include nonanoic, pelargonic, stearic, 12-hydroxy stearic and oleic acids. Also included are fatty acid mixtures such as tallow fatty acid, hydrogenated fish oil acids, etc. $C_{14}$ to $C_{24}$ fatty acids, and mixtures thereof, are particularly preferred.

One type of sludge dispersant is the phosphosulfurized polyolefins prepared by reacting a polymer of a $C_2$ to $C_6$ monoolefin-1 with $P_2S_5$ for 0.5 to 15 hours at 150° to 600° F. to form a material believed to be a dithiophosphoric acid. $P_2S_5$ treated polyisobutylene of 40 to 250 carbon atoms is a particularly preferred dispersant of this type. Preparation of these phosphosulfurized polyolefins is well known, for example see U.S. Patent No. 2,875,188. The phosphosulfurized polyolefin can be used per se, or it can be first hydrolyzed wherein it is treated with steam to increase its acidity, or it can be used in the form of its metal salts, e.g. it can be coneutralized with the other acids.

Other types of sludge dispersants are imides and amides formed by reaction of a mole of polyethyleneamine containing 2 to 12 nitrogen atoms per molecule, e.g. tetraethylenepentamine (5 nitrogen atoms), with one to three moles of a long chain mono- or dicarboxylic acid or anhydride, containing a total of 50 to 250 carbon atoms, such as polyisobutenylsuccinic anhydride or polyisobutenyl monocarboxylic acid having the structure $R—CH_2CH_2—COOH$ where R is the polyisobutenyl group. Examples of such dispersants are described in French Patents 1,374,541; 1,370,506; and 1,367,939; and Belgian Patents 638,130 and 638,288.

Another type of dispersants includes said polyisobutenylsuccinic anhydride per se, said polyisobutenyl monocarboxylic acid per se, and metal salts of these materials.

The polyolefin used to suppress thixotropy induced by the polycarboxylic acid includes polyethylene and polypropylene which will usually have molecular weight of about 500 to 50,000 preferably 1,000 to 20,000.

The polycarboxylic acids used as the gelling agent include those oil-soluble acids having the general formula: $R(COOH)_n$ wherein $n$ is 2 or 3, and wherein R is a $C_{18}$ to $C_{60}$, preferably $C_{36}$ to $C_{54}$, hydrocarbon radical, either saturated or unsaturated, and which preferably is aliphatic, aromatic or alicyclic. While some of the higher molecular weight acids will be solid, they can be dispersed in the oil by heating the acid in the oil sufficiently to melt the acid, while stirring. Concentrates of the acid in oil can be prepared in this manner, and these concentrates, in turn, can be added to the fluid calcium mixed salt composition with simple mixing. Examples of such polycarboxylic acids include: 1,20-eicosanedioic, 1,32-dotricontanedioic; 1,18-octadecanedioic and dimers and trimers of fatty acids such as the dimer and trimer of linoleic acid which are commercially available from Emery Industries. Linoleic dimer acid is formed by reaction of two molecules of linoleic acid in a typical Diels-Alder reaction. This dimer acid is described in U.S. Patent 2,424,588. Its formation and structure is believed to be as follows:

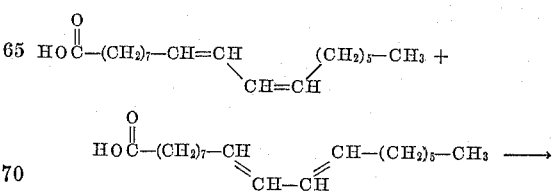

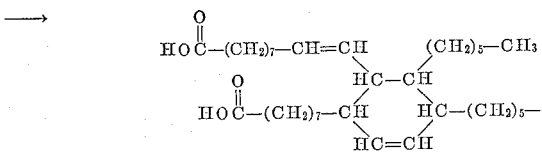

Linoleic trimer acid is tricarboxylic acid formed by polymerization of three molecules of linoleic acid which are linked together by their unsaturation.

Further descriptions of these linoleic dimer and trimer acids are given in the catalog "Empol Dimer Acids," by Emery Industries, Inc., copyright 1963.

The lubricating oil used in the compositions of the invention may be either a mineral lubricating oil or a synthetic lubricating oil. Synthetic lubricating oils which may be used include esters of dibasic acids (e.g. di-2-ethylhexyl sebacate), esters of glycols (e.g. $C_{13}$ Oxo acid diester of tetraethylene glycol), complex esters (e.g. the complex ester formed by reacting one mole of sebacic acid with two moles of tetraethylene glycol and two moles of 2-ethyl-hexanoic acid), halocarbon oils, alkyl silicates, sulfate esters, mercaptals, formals, polyglycol type synthetic oils, etc.

Various other additives may also be added to the lubricating composition (e.g. 0.1 to 5.0 weight percent based on the total weight of the composition), for example, oxidation inhibitors such as phenyl-alpha-naphthylamine; corrosion inhibitors, such as sorbitan monooleate, stabilizers such as aluminum hydroxy stearate; supplemental grease thickeners; and the like.

The invention will be further understood by reference to the following examples which include a preferred embodiment of the invention and wherein all parts are parts by weight.

EXAMPLE I

*Part A.*—A fluid calcium mixed salt dispersion was prepared as follows: 3.44 parts of beef tallow fatty acid, 14.2 parts of hydrated lime and 52 parts of mineral lubricating oil having a viscosity of 150 SUS at 100° F. were added to a grease kettle and intimately mixed with 3.36 parts of concentrate consisting of 70 wt. percent phosphosulfurized polyisobutylene of 800 molecular weight in 30 wt. percent mineral lubricating oil. Next, 22 parts of glacial acetic acid was slowly added to the mixture with stirring, while maintaining the temperature below about 140° F. The composition was then heated to 300° F. and maintained at this temperature for about ½ hour in order to dehydrate the mixture sufficiently to form calcium acetate half hydrate. This product was then cooled to 200° F. and five additional parts of the aforesaid concentrate of the phosphosulfurized polyisobutylene was added. The product was then filtered through filter paper using Hyflo filter aid (diatomaceous earth) to give a transparent clear fluid product utilizing a mole ratio of about 30 moles of acetic acid per mole of tallow fatty acid.

The tallow fatty acid (beef tallow acid) used above had a saponification number of about 195, and an iodine number (Wijs) of about 55 and consisted of about 55 wt. percent $C_{16}$ acid and about 45 wt. percent $C_{18}$ acid.

The aforesaid phosphosulfurized polyisobutylene was prepared by reacting polyisobutylene of about 800 molecular weight with 15 wt. percent $P_2S_5$, based on the weight of polyisobutylene, at about 425° F. for about 8 hours under a nitrogen atmosphere.

*Part B.*—A fluid dispersion of linoleic trimer acid and polyethylene in mineral oil was prepared as follows: 5 parts of polyethylene of about 5000 molecular weight was added to 94 parts of a mineral lubricating oil having a viscosity of 55 SUS at 210° F. and heated to 385° F. while stirring. At this temperature the polymer melted and dispersed in the oil, which was then slowly cooled and formed a clear transparent fluid. The mixture was allowed to cool to about 300° F., where one part of phenyl-alpha-naphthylamine was added as an antioxidant. On further cooling to about 100° F., two parts of said linoleic trimer acid was stirred into the mixture to give said fluid dispersion.

*Part C.*—40 parts of the product of Part A was simply mixed at room temperature with 60 parts of the dispersion of Part B to thereby give a solid, transparent, structurally stable, high melting point grease by this mixture.

*Part D.*—40 parts of the product of Part A was mixed at room temperature with 60 parts of mineral lubricating oil of 78 SUS viscosity at 100° F. to give a fluid mixture. Then 2 parts of linoleic trimer acid was added which converted said fluid mixture almost instantaneously into a solid grease.

*Part E.*—40 parts of the product of Part A was mixed at room temperature with 60 parts of mineral lubricating oil of 78 SUS viscosity at 100° F. Two parts of the aforesaid linoleic dimer acid was added and a soft grease formed.

The compositions of preceding grease compositions of Parts C to E, and their properties are summarized in the following table:

TABLE

| | C | D | E |
|---|---|---|---|
| Composition (Wt. Percent): | | | |
| Glacial acetic acid | 8.80 | 8.80 | 8.80. |
| Tallow fatty acid | 1.38 | 1.38 | 1.38. |
| Oil Solution $P_2S_5$ treated polyisobutylene (70%) | 3.34 | 3.32 | 3.32. |
| Hydrated lime | 5.68 | 5.68 | 5.68. |
| Phenyl-alpha naphthylamine | .60 | | |
| Polyethylene | 3.00 | | |
| Trimer acid | 1.20 | 2.00 | |
| Dimer acid | | | 2.00. |
| Total mineral lubricating oil | 76.00 | 78.82 | 78.82. |
| Properties: | | | |
| Appearance | Excellent, Transparent | Clear and Transparent | Soft grease. |
| Dropping Point, ° F. Hot Plate Method | 500+ | None | |
| Penetration, ASTM, 77° F. mm./10: | | | |
| Unworked | 285 | 280 | 360. |
| Worked 60 Strokes | 293 | 320 | 360. |
| Worked 10,000 Strokes | 325 | 342 | 380. |
| Water Solubility, Boiling Water | Insoluble | Insoluble | |
| Wheel Bearing Test, (220° F.) | Pass | Pass | Pass. |
| Lubrication Life,[1] Hrs. 10,000 r.p.m., 250° F | 2,000+ | | |

[1] NLGI-ABEC Spindle Test.

In the compositions of Parts C, D, and E, the dispersant was the $P_2S_5$ treated polyisobutylene. That portion of the $P_2S_5$ treated polyisobutylene (3.36 parts concentrate) added in Part A along with the acetic and tallow acid was substantially converted to its calcium salt as it was neutralized along with the acetic acid and the tallow fatty acid by the lime. That portion of the $P_2S_5$ treated polyisobutylene (5.00 parts concentrate) of Part A added at 200° F. (after neutralization and after dehydration) was not neutralized because the lime had been consumed. The compositions of Parts C, D, and E were excellent calcium mixed salt greases wherein the calcium mixed salt portion, which is prone to contamination, has been successfully filtered and then easily converted into a solid grease. The greases of Parts D and E had thixotropic tendencies, but the grease of Part C was non-thixotropic due to the polyethylene polymer.

EXAMPLE II

A grease is prepared in the manner of Example I, Parts A, B, and C, except that the five additional parts of the concentrate of the phosphosulfurized polyisobutylene added in Example I, Part A when the grease had cooled to 200° F. were not added. In other words, the grease of Example II utilized only 3.36 parts of the concentrate. The resulting grease had substantially the same properties as grease C in the foregoing table.

EXAMPLE III

Example II is repeated, except the dispersant is 3.36 parts of polyisobutenylsuccinic anhydride of 1100 mol. wt. in place of the 3.36 parts of concentrate of $P_2S_5$ polyisobutylene specified in Part A of Example I, and the amount of lime is adjusted to neutralize said anhydride.

EXAMPLE IV

Example III is repeated, except that the dispersant is polyisobutenyl monocarboxylic acid having the structure R—$CH_2CH_2$—COOH wherein R is a polyisobutenyl group of about 50 carbon atoms.

EXAMPLE V

Example III is repeated, except that the dispersant is polyisobutenyl monocarboxylic acid having the structure R—$CH_2CH_2$—COOH where R is a polyisobutenyl group of 80 carbon atoms) condensed with 3 molar proportions of tetraethylenepentamine and the amount of lime used is such as to form a neutral product.

EXAMPLE VI

Example V is repeated, except that the dispersant is an imide obtained by condensation of one mole of polyisobutenylsuccinic anhydride of 1100 mol. wt. with one mole of tetraethylenepentamine.

EXAMPLE VII

Example I, Parts A, B, and C are repeated, except that the 5.00 parts of concentrate of $P_2S_5$ treated polyisobutylene added at the 200° F. temperature level is the only portion of said concentrate added, and the amount of lime is adjusted so as to neutralize only said acetic and tallow acid.

While the preceding has been primarily directed to formation of calcium mixed salt grease, wherein the calcium mixed salt portion can be filtered to remove contaminants, the concept of the invention is applicable to obtaining other advantages. For example, fluid type calcium mixed salt lubricants are widely used for marine diesel cylinder lubrication, while calcium mixed salt solid greases are widely used in industrial and automotive use. The fluid type marine diesel lubricants are usually prepared in the form of concentrates, which contain dispersants for improving stability, and are then diluted to form the final marine lubricant. By means of the present invention, a single type of concentrate can be made containing the calcium mixed salts and the dispersant. This concentrate can then be simply diluted with additional oil to form a marine diesel cylinder fluid lubricant, or the same concentrate can be converted into a solid grease by the addition of the previously described polycarboxylic acid. In this manner, more flexibility is introduced into the grease plant since a single concentrate formulation can be made in large quantities, which can then later be converted into fluid lubricants or into solid grease. If the grease is destined for industrial use where contamination is of no concern then, of course, it is not necessary to filter the concentrate before converting it into a solid grease by the addition of the polycarboxylic acid.

In sum, the invention relates to improvements in grease compositions and their manufacture, wherein a fluid base composition containing a high proportion of calcium mixed salts and containing a dispersant can be converted into a solid grease structure, i.e. solid at 77° F., by the simple addition of a small amount of a polycarboxylic acid.

What is claimed is:

1. In a method of converting a fluid composition comprising lubricating oil, about 20 to 50 wt. percent of calcium mixed salts of acetic acid and $C_8$ to $C_{30}$ fatty acid in a relative molar ratio of about 1:1 to 40:1, and about 0.5 to 10.0 wt. percent of a dispersant which tends to maintain said composition in a fluid state, the improvement which comprises converting said fluid composition into a grease which is normally solid at 77° F. by the addition of 0.5 to 5 wt. percent of a polycarboxylic acid of the formula: $R(COOH)_n$, wherein R is a hydrocarbon radical containing 18 to 60 carbon atoms, and $n$ is 2 to 3.

2. A method of preparing a calcium mixed salt, normally solid, lubricating grease comprising a major amount of mineral lubricating oil and about 20 to 40 wt. percent of said mixed salt, wherein said mixed salt is formed by neutralizing acetic acid and $C_8$ to $C_{30}$ fatty acid with lime, and wherein said grease is substantially free of contaminants, which comprises neutralizing in at least a portion of said oil, said acetic acid and said fatty acid in a relative molar proportion of about 1 to 40 moles of said acetic acid per mole of said fatty acid in the presence of 2 to 6 wt. percent of a dispersant which fluidizes said mixed salt composition to thereby obtain a fluid mixed salt composition, filtering said fluid mixed salt composition to remove contaminants, and then adding about 0.5 to 5 wt. percent of a polycarboxylic acid of the formula: $R(COOH)_n$, wherein R is a hydrocarbon radical containing 18 to 60 carbon atoms, and $n$ is 2 to 3, to thereby convert said fluid composition into said normally solid lubricating grease.

3. A method according to claim 2, wherein said dispersant is selected from the group of materials consisting of (a) phosphosulfurized polymers of $C_2$ to $C_6$ mono-olefin-1 containing 40 to 250 carbon atoms in said polymer, (b) polyisobutenylsuccinic anhydride, (c) polyisobutenyl monocarboxylic acid, calcium salts of the aforesaid materials (a), (b), and (c), and (d) condensation products of materials b and c with polyethyleneamines containing 2 to 12 nitrogen atoms per molecule.

4. A method according to claim 2, wherein about 0.5 to 7.0 wt. percent of a polymer of a $C_2$ to $C_3$ olefin, having a molecular weight of about 500 to 50,000 to said grease is added to inhibit thixotropy.

5. A method according to claim 2, wherein said fatty acid contains 16 to 24 carbon atoms, said dispersant is phosphosulfurized polyisobutylene containing 40 to 250 carbon atoms and said polycarboxylic acid is a polymer of linoleic acid.

6. A method according to claim 5, wherein said polymer of linoleic acid is the dimer acid.

7. A method according to claim 5, wherein said polymer of linoleic acid is the trimer acid.

References Cited by the Examiner
UNITED STATES PATENTS

| | | | |
|---|---|---|---|
| 3,113,107 | 12/1963 | Borg | 252—56 |
| 3,125,521 | 3/1964 | Detiveiler et al. | 252—40.7 |
| 3,200,073 | 8/1965 | Criddle | 252—56 |
| 3,251,774 | 5/1966 | Borg et al. | 252—56 |

DANIEL E. WYMAN, *Primary Examiner.*

I. VAUGHN, *Assistant Examiner.*